United States Patent [19]

Yamada

[11] Patent Number: 4,523,838

[45] Date of Patent: Jun. 18, 1985

[54] IMAGE FORMING APPARATUS

[75] Inventor: Yu Yamada, Kokubunji, Japan

[73] Assignee: Canon Kabushiki Kaisha, Tokyo, Japan

[21] Appl. No.: 446,496

[22] Filed: Dec. 3, 1982

[30] Foreign Application Priority Data

Dec. 8, 1981 [JP] Japan ............................... 56-197218

[51] Int. Cl.[3] ............................................. G03B 27/48

[52] U.S. Cl. ........................................... 355/66; 355/8

[58] Field of Search ........................ 355/3 R, 8, 51, 60, 355/65, 66, 44, 43

[56] References Cited

U.S. PATENT DOCUMENTS 4,027,962 6/1977 Mailloux ........................... 355/43 X 4,120,580 10/1978 Mailloux et al. ............... 355/3 R X

*Primary Examiner*—L. T. Hix

*Assistant Examiner*—Brian W. Brown

*Attorney, Agent, or Firm*—Fitzpatrick, Cella, Harper & Scinto

[57] ABSTRACT

An image forming apparatus provided with a first projection optical system for forming an intermediate image of a desired final image, a second projection optical system for slit scanning the intermediate image to reconstruct the intermediate image, by off-axis imaging, on a light-receiving member, and optical device for co-ordinating the directions of the principal rays from the intermediate image in a slit scanning sectional plane with that of principal rays of the second projection optical system.

5 Claims, 7 Drawing Figures

IMAGE FORMING APPARATUS

BACKGROUND OF THE INVENTION

1. Field of the Invention

The present invention relates to an image forming apparatus for forming an image of a photograph, a microfilm or the like on a light-receiving medium such as a photosensitive member.

2. Description of the Prior Art

Japanese Patent Application Publication No. 24187/1971 discloses an image forming apparatus for copying an original such as a photographic film, a microfilm or a drawing in an enlarged, one-to-one or reduced size. This apparatus includes a first projection optical system with a fixed lens for forming an aerial image of said original, and a second projection optical system for slit scanning said aerial image to re-focus said image on a photosensitive member. FIG. 1 shows said apparatus in a slit scanning sectional plane, namely in a plane perpendicular to the longitudinal direction of slit aperture, while FIG. 2 shows said apparatus in a section perpendicular to said slit scanning sectional plane. As shown in FIGS. 1 and 2, an image of a film 1 is formed by a projection lens 2 in the vicinity of two cylindrical Fresnel lenses 3, 4 which are superposed, as shown in FIG. 3, in such a manner that their generatrices mutually cross perpendicularly and their optical axes coincide with that of said projection lens 2. The cylindrical Fresnel lens 3 has a power in said slit scanning sectional plane while the cylindrical Fresnel lens 4 has a power in a plane perpendicular to the slit scanning sectional plane.

In the slit scanning sectional plane shown in FIG. 1, the cylindrical Fresnel lens 3 deflects principal rays R1 and R3, emerging from the projection lens 2, in the direction parallel to a principal ray R2, thus providing mutually parallel principal rays, after the Fresnel lenses, in said section as plane. Said principal ray R2 is parallel to and coincides with the optical axis of the projection lens 2. On the other hand, in the section perpendicular to the slit scanning sectional plane, shown in FIG. 2, principal rays R2, R4, R5 from said projection lens 2 are guided by the cylindrical Fresnel lens 4 toward the pupil of a copying lens 5. The aerial image of said film 1 is scanned and projected onto a photosensitive member 6 with displacement of said copying lens 5 in the direction of the arrow in the slit scanning sectional plane. The center a of said Fresnel lens 4, where the Fresnel angle is equal to zero, is positioned corresponding to the center b of an effective copying area.

On the other hand, in order to reduce the dimension of an image forming optical system for copying with slit scan, there is already known such an arrangement as shown in FIG. 4, in which an original and a photosensitive member are positioned optically conjugate, with the use of off-axis imaging of a copying lens. In said arrangement, the image of an original on a platen 7 is projected onto a photosensitive member 11 through two scanning mirrors 8, 9 performing slit scanning of said original by displacements to respective positions 8', 9' along said platen 7, and also through an in-mirror lens 10. In such arrangement, however, a principal ray R6 of the copying optical system is positioned oblique to the optical axis C of said in-mirror lens 10. Consequently, such slit scanning optical system utilizing off-axis imaging, if positioned to receive the light from the cylindrical Fresnel lenses 3, 4 shown in FIG. 1, is unable to guide the light to the photosensitive member 11.

SUMMARY OF THE INVENTION

An object of the present invention is to provide an image forming apparatus capable of at first forming an intermediate image of a desired image and then slit scanning said intermediate image to form said desired image on a light-receiving member at a determined position, wherein the light beams from said intermediate image can be efficiently guided onto said light-receiving member through a compact optical arrangement.

Another object of the present invention is to provide an image forming apparatus allowing arbitrary selection of the size of the image to be formed on said light-receiving member.

The above-mentioned objects can be achieved according to the present invention by an apparatus comprising a first projection optical system for forming an intermediate image of the desired image, a second projection optical system for slit scanning said intermediate image, formed by said first projection optical system, to reconstitute said intermediate image, by off-axis imaging, onto said light-receiving member, and optical means for co-ordinating the directions of principal rays from said intermediate image, in the slit scanning sectional plane, with the directions of principal rays of said second projection optical system.

More specifically, in the slit scanning sectional plane, said optical means changes the directions of principal rays from said intermediate image in such a manner that said principal rays after passing said optical means are no longer parallel but form a certain angle relative to the optical axis of said first projection optical system. Said optical means, of course, adjusts the principal rays in such a manner that they are mutually parallel in said scanning sectional plane after passing said optical means.

DESCRIPTION OF THE PREFERRED EMBODIMENTS

Figure 5:
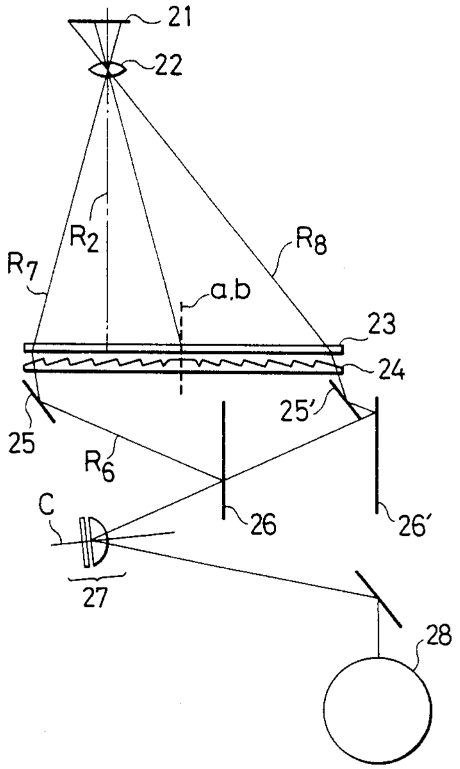

FIG. 5 shows an embodiment of the present invention, in the slit scanning sectional plane, in which an image of an original 21 such as a microfilm is formed in the vicinity of cylindrical Fresnel lenses to be explained later, by a fixed projection lens 22 constituting a first projection optical system. Said cylindrical Fresnel lenses 23, 24 are similar to the lenses 3, 4 shown in FIG. 1, wherein the lens 23 has a power only in a plane perpendicular to the slit scanning sectional plane while the lens 24 has a power only in the slit scanning sectional plane. The positions of said cylindrical Fresnel lenses 23, 24 are mutually interchangeable. Movable scanning mirrors 25, 26 (25', 26') and an in-mirror lens 27, constituting a second projection optical system, scan the image of said original to reqonstruct the aerial image on a photosensitive member 28. In the embodiment shown in FIG. 5, the optical axis R2 of the projection lens 22 is so eccentrically aberrated from the optical axis a of the Fresnel lenses that principal rays R7, R8 after passing the cylindrical Fresnel lenses 23, 24 form a predetermined angle, other than 90°, relative to the optical axis R2 of the first projection optical system. Therefore, in the slit scanning sectional plane, the principal rays R7, R8 after passing the cylindrical Fresnel lenses 23, 24 travel in substantially the same direction which is not parallel to the optical axis R2 of the first projection optical system but co-ordinated with the direction of principal ray R6 of the slit scanning system constituting the second projection optical system. Thus, the directions of the principal rays after passing the cylindrical Fresnel lenses 23, 24 can be regulated by changing the degree of eccentricity. The optical paths of the apparatus of FIG. 5 in a sectional plane perpendicular to the slit scanning sectional plane are substantially the same as those shown in FIG. 2 and the description therefor is omitted herein.

Figure 1:
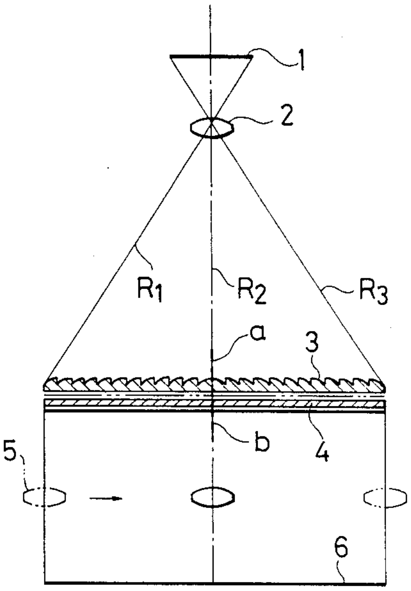
FIG. 1 PRIOR ART
FIGS. 1, 2 and 3 are schematic views of a conventional image forming apparatus.
Figure 2:
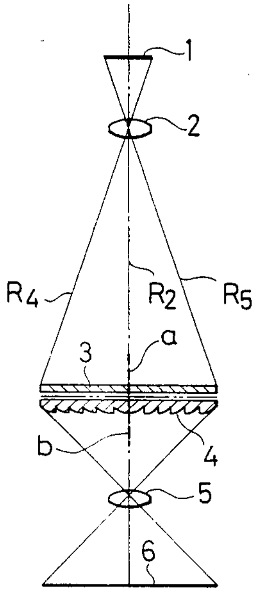
FIG. 2 PRIOR ART
Figure 3:
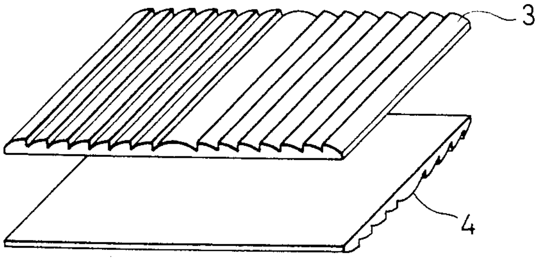
FIG. 3 PRIOR ART
Figure 4:
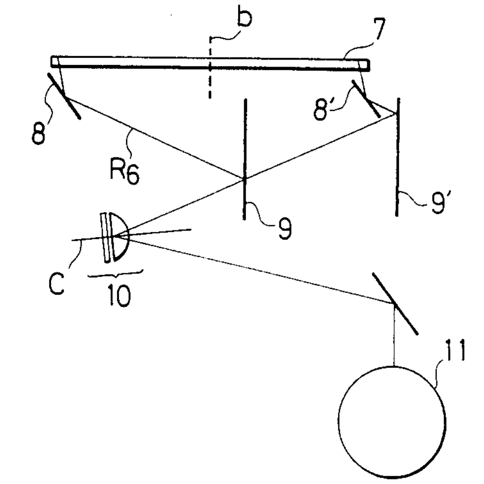
FIG. 4 PRIOR ART
FIG. 4 is a schematic view showing a conventional slit scanning apparatus utilizing the off-axis imaging.
Figure 6:
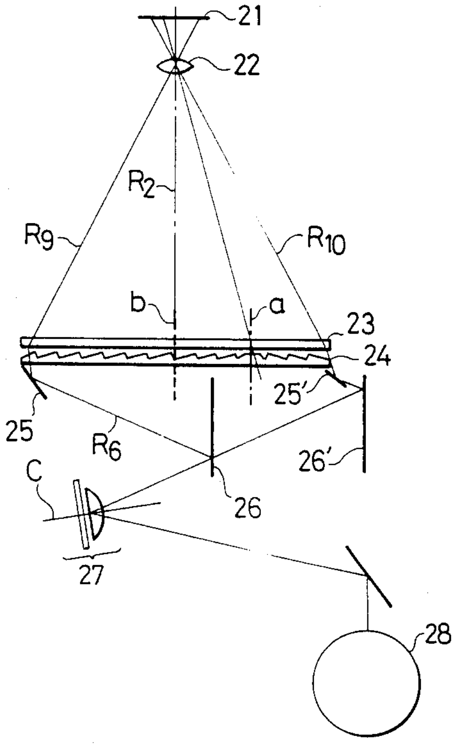

In the embodiment shown in FIG. 5, however, the projection lens 22 has to have a wider angle of view than that of the projection lens 2 shown in FIG. 1, since the center of the image subjected to slit scanning, namely the center b of the effective copying frame is eccentrically aberrated from the optical axis R2 of the projection lens 22. FIG. 6 shows a second embodiment of the present invention capable of achieving the aforementioned objects without the use of a wide-angle lens. In FIG. 6, showing a view in the slit scanning sectional plane, members similar to those in FIG. 5 are represented by the same numbers. In the embodiment shown in FIG. 6, the center b of said effective copying frame coincides with the optical axis R2 of the projection lens 22 but is eccentrically aberrated from the center a of the cylindrical Fresnel lenses 23, 24, whereby principal rays R9, R10 emerging from the original 21 through the projection lens 22 can be directed, after passing the Fresnel lenses 23, 24, to the photosensitive member 28 along the direction of principal ray R6 of the in-mirror lens 27. The directions of principal rays after passing the Fresnel lenses 23, 24 can be regulated by changing the degree of eccentricity. The optical paths in a plane perpendicular to the slit scanning sectional plane are substantially the same as those shown in FIG. 2 and therefore a description thereof is omitted.

Figure 7:
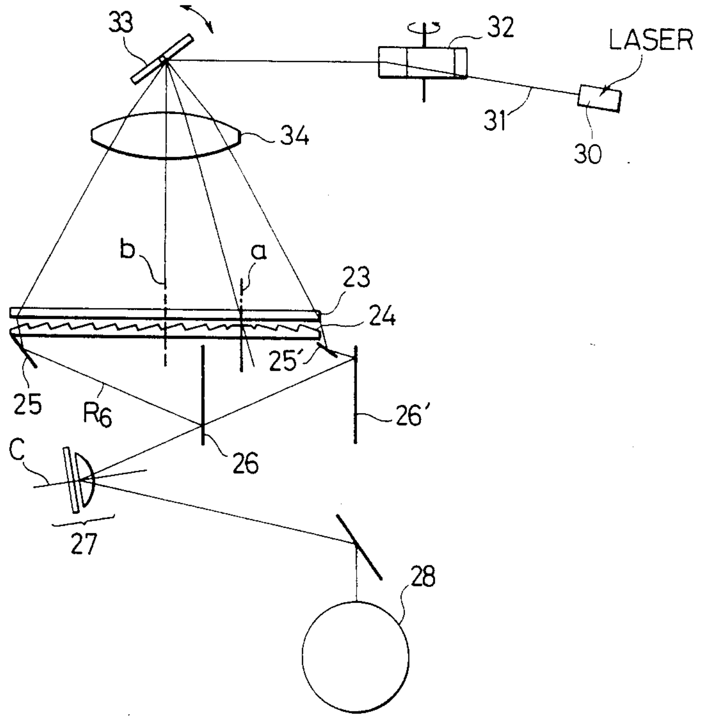
FIGS. 5, 6 and 7 are views of different embodiments of the image forming apparatus of the present invention.

FIG. 7 shows a third embodiment of the present invention adapted for image formation from data stored in a computer, obtained from a sensor such as CCD or transmitted through a facsimile, in contrast to the foregoing embodiments shown in FIGS. 5 and 6 for image formation from an original such as a microfilm. In FIG. 7, a semiconductor laser 30 is directly modulated by signals representing image information, and therefore emits a modulated laser beam 31 containing said image information, which is guided through a two-dimensional scanning system composed of a polygonal mirror 32 and a vibrating mirror 33 and forms, through a focusing lens 34, an intermediate image in the vicinity of the aforementioned Fresnel lenses 23, 24. Said two-dimensional scanning system is so positioned that the faster main scanning with the polygonal mirror 32 corresponds to the longitudinal direction of the slit, which is perpendicular to the plane of drawing. Said intermediate image is reconstructed on the photosensitive member 28 through the Fresnel lenses 23, 24 and the slit scanning optical system 25, 26, 27 which are the same as those shown in FIG. 6. From this, it will be apparent that the present invention can employ various methods for forming an intermediate image in the vicinity of the Fresnel lenses 23, 24.

In the foregoing embodiments, the cylindrical Fresnel lenses 23, 24 have a function of a three-dimensional field lens for diverting the principal rays from the first projection optical system by desired angles independently, in the slit scanning sectional plane and in a plane perpendicular thereto, but such function can also be achieved by a toric lens having different curvatures in mutually perpendicular directions or any anamorphic optical system having different refractive powers in the mutually perpendicular directions.

It will be understood that the in-mirror lens used for the off-axis imaging in the foregoing embodiment may be replaced by a lens of transmission type.

In the foregoing embodiments, the size of the finally obtained image can be regulated by changing the imaging magnification of the projection lens 22 to change the size of the intermediate image, by changing the imaging magnification of the imaging lens 27 in the slit scanning optical system, or by the combination of these two methods.

What I claim is:

1. An image forming apparatus comprising:
   - first optical means for forming an intermediate image of a desired final image;
   - second optical means for slit scanning the intermediate image formed by said first optical means to reconstruct the intermediate image, by off-axis imaging, on a light-receiving member, said second optical means including a movable mirror for scanning said intermediate image and a fixed image forming optical system; and
   - optical means disposed between said first and second optical means for diverting the principal rays from the intermediate image, in a slit scanning sectional plane, in the same direction which is not parallel to the optical axis of said first optical means.

2. An image forming apparatus according to claim 1, wherein the directions of the principal rays from said intermediate image, in the slit scanning sectional plane, are co-ordinated with the direction of the principal rays of said second optical means.

3. An image forming apparatus comprising:
   - a first image forming optical system for forming a first image of a desired final image;
   - a second image forming optical system for slit scanning said first image to reconstruct said first image, by off-axis imaging, on a light-receiving member, said second image forming optical system including a movable mirror for scanning said first image and a fixed image forming optical system;
   - an optical member located between said first image forming optical system and said second image forming optical system, a center of the power of said optical member in a slit scanning sectional plane being disposed in a different position from that of the optical axis of said first image forming optical system so that each light beam from said optical member may be guided in such a manner that the exit direction of each principal ray of said light beam is the same and is not parallel to the optical axis of said first optical system.

4. An image forming apparatus according to claim 3, wherein said optical member comprises a cylindrical Fresnel lens having a power solely in the slit scanning sectional plane.

5. A copying apparatus for forming an image of an original on a photosensitive drum comprising:

a projection optical system for forming an aerial image of the original;

a slit scanning optical system for slit scanning said aerial image to form the image of said original, by off-axis imaging, on the photosensitive drum, said slit scanning optical system including a movable mirror for scanning said aerial image and a fixed image forming optical system; and anamorphic optical means disposed between said projection optical system and said slit scanning optical system for diverting the principal rays from said aerial image, in a slit scanning sectional plane, in the same direction which is not parallel to the optical axis of said projection optical system.

* * * * *